(12) United States Patent
Hsiao et al.

(10) Patent No.: US 6,996,894 B2
(45) Date of Patent: Feb. 14, 2006

(54) METHODS OF MAKING MAGNETIC HEADS WITH IMPROVED CONTIGUOUS JUNCTIONS

(75) Inventors: Richard Hsiao, San Jose, CA (US); Wipul Pemsiri Jayasekara, San Jose, CA (US); Mustafa Pinarbasi, Morgan Hill, CA (US); Patrick Rush Webb, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 655 days.

(21) Appl. No.: 10/109,110

(22) Filed: Mar. 28, 2002

(65) Prior Publication Data

US 2003/0182790 A1    Oct. 2, 2003

(51) Int. Cl.
*G11B 5/127* (2006.01)
*B44C 1/22* (2006.01)

(52) U.S. Cl. .............. 29/603.12; 29/603.13; 29/603.15; 29/603.16; 29/603.18; 204/192.34; 216/22; 216/40; 360/322

(58) Field of Classification Search .......... 29/603.07, 29/603.12, 603.13, 603.15, 603.16, 603.18; 204/192.43, 192.32; 216/22, 40; 360/322, 360/327.33, 122, 125
See application file for complete search history.

(56) References Cited

U.S. PATENT DOCUMENTS

| 5,469,317 | A |   | 11/1995 | Nagata et al. |
| 5,745,978 | A |   | 5/1998  | Aboaf et al. |
| 5,920,980 | A | * | 7/1999  | Han et al. ............ 29/603.15 X |
| 5,930,084 | A |   | 7/1999  | Dovek et al. |
| 6,085,406 | A |   | 7/2000  | Garfunkel et al. |
| 6,176,005 | B1 |  | 1/2001  | Garfunkel et al. |
| 6,178,066 | B1 |  | 1/2001  | Barr |
| 6,181,532 | B1 |  | 1/2001  | Dovek et al. |

FOREIGN PATENT DOCUMENTS

| JP | 8022610 A   |   | 1/1996 |
| JP | 2001-28110  | * | 1/2001 |

* cited by examiner

*Primary Examiner*—A. Dexter Tugbang
(74) *Attorney, Agent, or Firm*—John J. Oskorep, Esq.

(57) ABSTRACT

Methods of making a read head with improved contiguous junctions are described. After sensor layer materials are deposited over a substrate, a lift-off mask is formed over the sensor layer materials in a central region which is surrounded by end regions. Ion milling is performed with use of the lift-off mask such that the sensor layer materials in the end regions are removed and those in the central region remain to form a read sensor. A high-angle ion mill (e.g. between 45–80 degrees) is then performed to remove redeposited material from side walls of the lift-off mask. Next, a reactive ion etch (RIE) is used to reduce the thickness and the width of the lift-off mask and to remove capping layer materials from the top edges of the read sensor. With the reduced-size lift-off mask in place, hard bias and lead layers are deposited adjacent the read sensor as well as over the mask. The reduced-size lift-off mask allows the amount of hard bias to be increased in the contiguous junction region, and the edges of the leads to be deposited more closely over the top edges of the read sensor. Advantageously, the stability of the sensor is enhanced and the transfer curve is improved using a method which can be controlled independently from the initial mask structure and ion milling process. No critical alignments or multiple photoresist processes are necessary.

20 Claims, 6 Drawing Sheets

(ABS)

METHODS OF MAKING MAGNETIC HEADS WITH IMPROVED CONTIGUOUS JUNCTIONS

BACKGROUND OF THE INVENTION

1. Field of the Invention

This invention relates generally to methods of making magnetic heads, and more particularly to methods of making magnetic heads with improved contiguous junctions by reducing the size of the lift-off mask after ion milling the sensor materials and before depositing the hard bias and lead layers.

2. Description of the Related Art

Magnetic head assemblies are typically made of multiple thin film layers which are patterned to form various shaped layers in the head. Some of the layers are plated while other layers are sputter deposited on a wafer substrate. The read head portion of a magnetic head assembly includes multiple layers that are typically sputter deposited. For example, the multiple layers of a read sensor, hard bias and lead layers connected to the read sensor, and first and second read gap layers below and on top of the read sensor are typically sputter deposited.

One prior art method of forming shaped sputter deposited layers is to sputter deposit a full film layer of the required material on a wafer substrate, form a patterned photoresist layer on the layer, ion mill away the exposed portion of the layer, deposit hard bias and lead layers, and remove the photoresist layer to thereby leave the desired shaped layer that was protected therebelow. This first conventional method of shaping sputter deposited layers has been generally superseded by a second conventional method which utilizes a bilayer lift-off mask scheme.

The bilayer lift-off mask used in the second conventional method has a T-shape (as seen in cross-section) wherein the vertical portion of the T is short and wide but less wide than the horizontal top portion of the T. The top portion of the T is generally a patterned photoresist layer and the bottom vertical portion of the T is a release layer. This configuration provides first and second undercuts (as seen in cross-section) wherein each undercut has a height and a length below the top photoresist portion. In this method, the bilayer lift-off mask is employed for the purpose of making contiguous junctions of the first and second hard bias/lead layers with first and second side edges respectively of the read sensor.

More particularly, multiple read sensor layers are sputter deposited in full film on the wafer substrate followed by formation of the bilayer lift-off mask covering a read sensor site. Ion milling is then employed to remove all of the read sensor material except that below the mask. Full films of hard bias and lead layer materials are then sputter deposited which cover the top of the lift-off mask and an area surrounding the lift-off mask. Typically, it is important that the height and length of the undercuts is sufficient such that a photoresist stripper can reach the bottom release layer. The stripper is then introduced to dissolve the bottom release layer after the hard bias and lead layer depositions. This causes the bilayer lift-off mask and the hard bias and lead materials deposited thereon to be released from the wafer substrate leaving the aforementioned contiguous junctions between the first and second hard bias/lead layers and the first and second side edges respectively of the read sensor.

The bilayer lift-off mask scheme significantly improves the making of read heads by forming contiguous junctions between the hard bias/lead layers and the read sensor. Fewer processing steps are required and the profile of the lead and hard bias layers above the read sensor has been reduced. Unfortunately, however, many bilayer lift-off masks using this conventional methodology are better suited for the construction of read heads with a track width of greater than approximately 0.2 microns. The more narrow the track width, the greater the tracks per inch (TPI) that can be read by the read head from a rotating magnetic disk. Accordingly, the greater the tracks per inch the greater the storage capacity of a disk drive employing such a read head.

The bi-layer lift-off mask is made using commercially available photoresists which are relatively thick (e.g. thicker than 3000 Angstroms). Such a thick photoresist layer causes shadowing where the thickness of the hard bias layers in the contiguous junction region is less than optimal. Also, the relatively large width of the photoresist causes the sensor coverage by the hard bias and lead layers to be less than ideal. Thus, it would be advantageous if the hard bias thickness were increased in the junction region and the conductive leads were deposited further over the edges of the read sensor. If this were the case, the stability and the transfer curve of the read sensor would be improved.

Variations of the lift-off mask scheme have improved the formation of the read sensor and solved some of these problems to a limited extent. For example, the "lead overlay" design provides for reduced track widths, but requires process alignments that are critical to the resulting structure, as well as multiple photoresist processes.

Accordingly, there is a strong-felt need for improved methods of forming read sensors with improved contiguous junctions. Methods that do not require critical alignments and more than one photoresist processes are preferable.

SUMMARY OF THE INVENTION

Methods of making a magnetic head with improved contiguous junctions are described herein. In one illustrative embodiment of the invention, a lift-off mask is formed over sensor materials in a central region which is surrounded by end regions. Ion milling with use of the lift-off mask is performed such that the sensor layer materials in the end regions are removed and those in the central region remain to form a read sensor. A high-angle ion mill (e.g. between about 45–80 degrees) is then performed to remove redeposited material from the lift-off mask. Next, a different etching process such as a reactive ion etch (RIE) is used to reduce the thickness or both thickness and the width of the lift-off mask. With the reduced-size lift-off mask in place, hard bias and lead layers are then deposited adjacent the read sensor.

The reduced-size lift-off mask allows for an increased amount of hard bias to be deposited in the contiguous junction region, and edges of the leads to be formed more closely over the top edges of the read sensor. Advantageously, the stability of the sensor is enhanced and the transfer curve is improved using a method which can be controlled independently from the initial mask structure and ion milling process. No critical alignments or multiple photoresist processes are necessary using this method.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
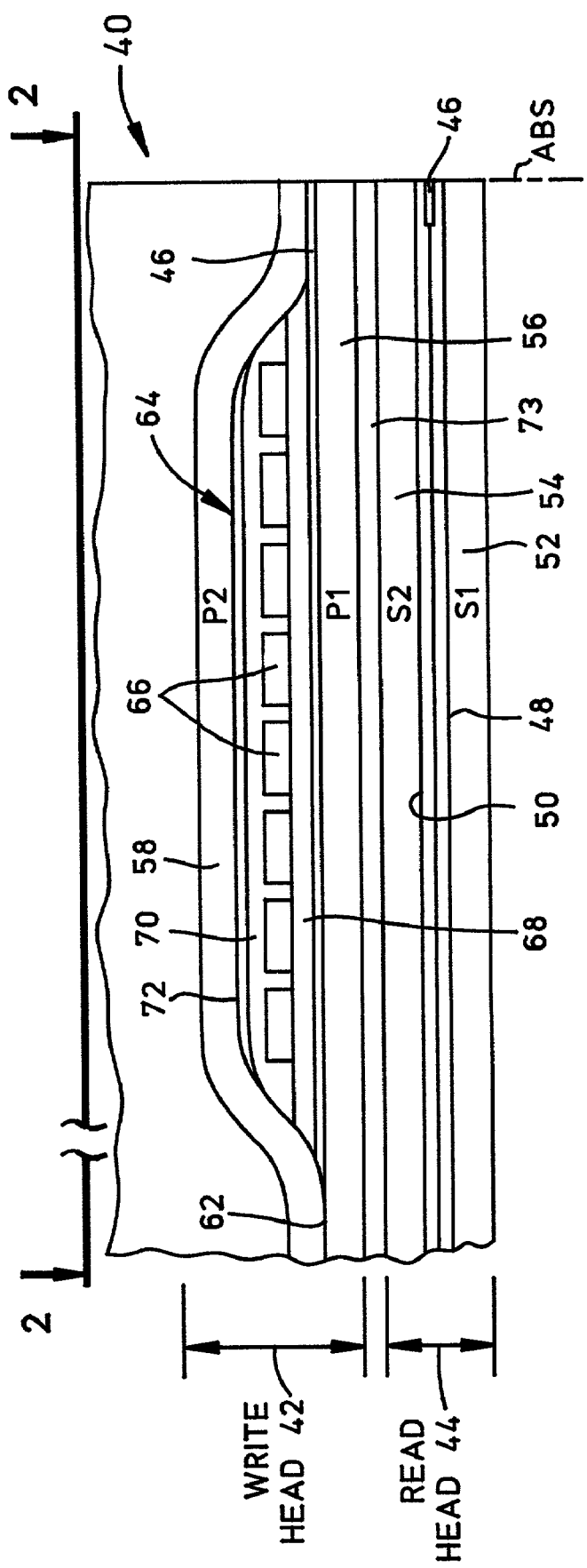
FIG. 1 is a longitudinal cross-sectional view of a portion of a magnetic head assembly including a read head and a write head.

FIG. 1 shows a magnetic head assembly 40 having a write head portion 42 and a read head portion 44. Read head portion 44 includes a multilayered read sensor 46 located between nonmagnetic electrically insulative first and second read gap layers 48 and 50. First and second lead layers, which will be described in more detail hereinafter, are connected to first and second side edges of read sensor 46. Read sensor 46 and first and second lead layers are located between nonmagnetic electrically insulative first and second read gap layers 48 and 50. In a merged magnetic head assembly, a second shield layer 54 also serves as a first pole piece layer 56 of the write head.

Figure 2:
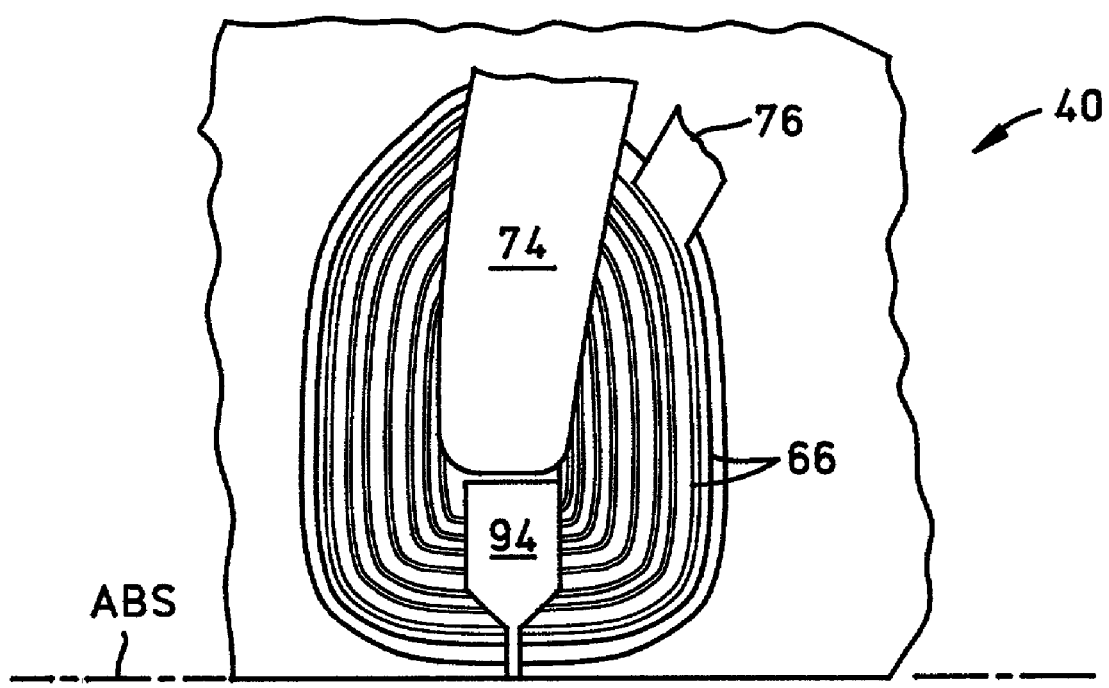
FIG. 2 is a view taken along plane 2—2 of FIG. 1 with all layers above the first insulation layer of the insulation stack removed except the coil layer, first and second leads for the coil layer and a second pole piece layer.

Write head portion 42 includes first and second pole piece layers 56 and 58 wherein second pole piece layer 58 is separated from first pole piece layer 56 by a nonmagnetic write gap layer 60 in the pole tip region and is connected to first pole piece layer 56 at a back gap 62 in a back gap region. Between the pole tip and back gap regions is a yoke region where an insulation stack 64 is located between first and second pole piece layers 56 and 58. Embedded within the insulation stack 64 is a pancake-shaped coil 66 which is located between first and second insulation layers 68 and 70 of the insulation stack and is capped by a third insulation layer 72 to smooth out ripples caused by the coil layer 66. First pole piece layer 56 is separated from second shield layer 54 by a nonmagnetic layer 73. Since first pole piece layer 56 is separated from second shield layer 54, this type of head is known in the art as a piggyback head. When first pole piece layer 56 and second shield layer 54 are a common layer, this is known in the art as a merged head. FIG. 2 is a top view of FIG. 1 which is extended to show the back portion of the write coil 66 with first and second leads 74 and 76 that are connected to the coil layer and that provide a write current thereto.

Figure 3:
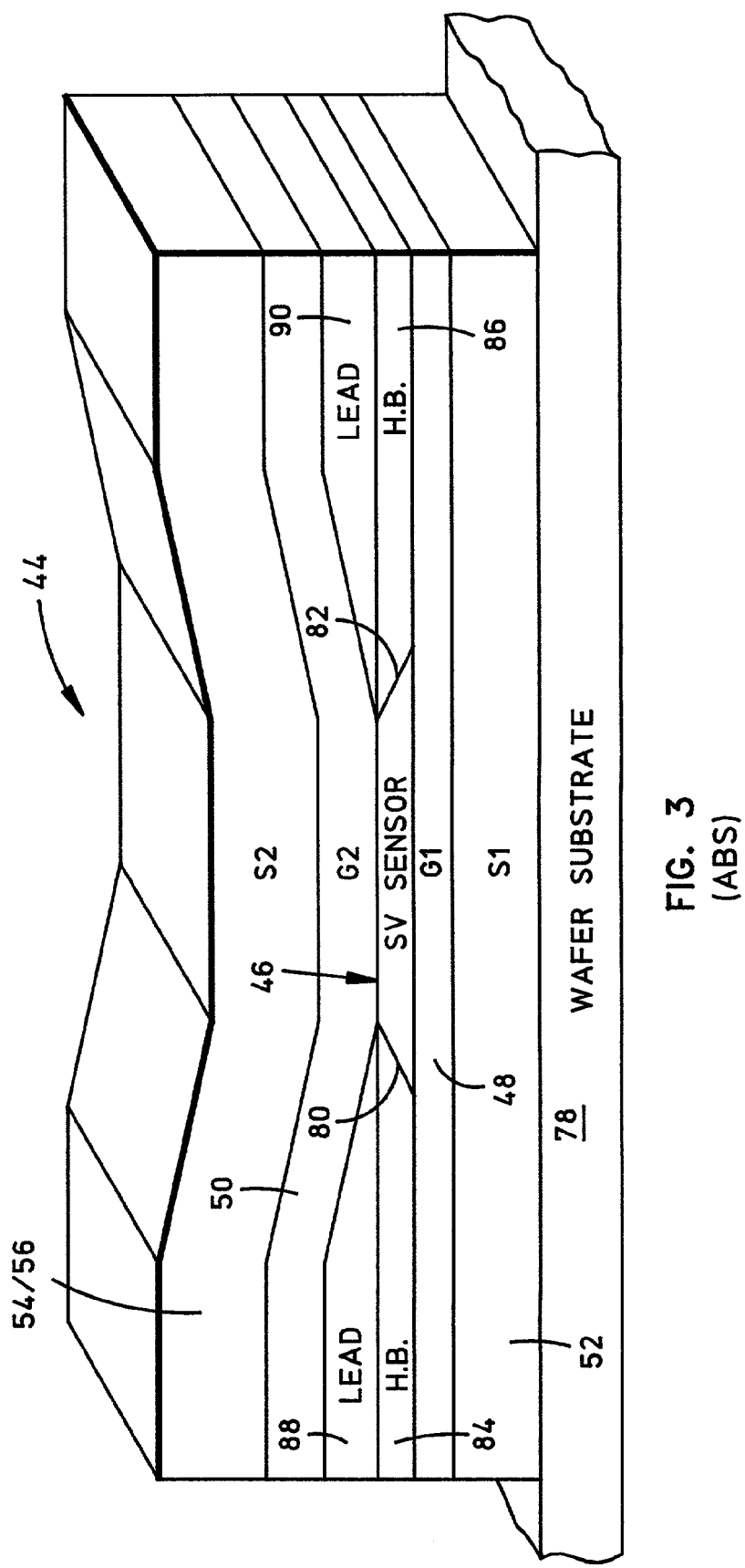
FIG. 3 is an air bearing surface (ABS) isometric schematic illustration of the read head portion of the magnetic head assembly of FIG. 1.

FIG. 3 is an enlarged isometric ABS illustration of read head portion 44 of magnetic head assembly in FIG. 1 which is constructed on a wafer substrate 78. Multilayered sensor 46 has first and second side edges 80 and 82 that are connected to first and second hard bias layers (HB) 84 and 86 and first and second lead layers 88 and 90. This type of connection is known in the art as a contiguous junction, a conventional one which is described in U.S. Pat. No. 5,018,037 hereby incorporated by referenced herein.

In accordance with the present invention, the magnetic head and the contiguous junction are formed using a process shown and described in relation to FIGS. 4–10. Reference will now be made to the flowchart of FIG. 4 in combination with the head formation illustrations in FIGS. 5–10.

Figure 4:
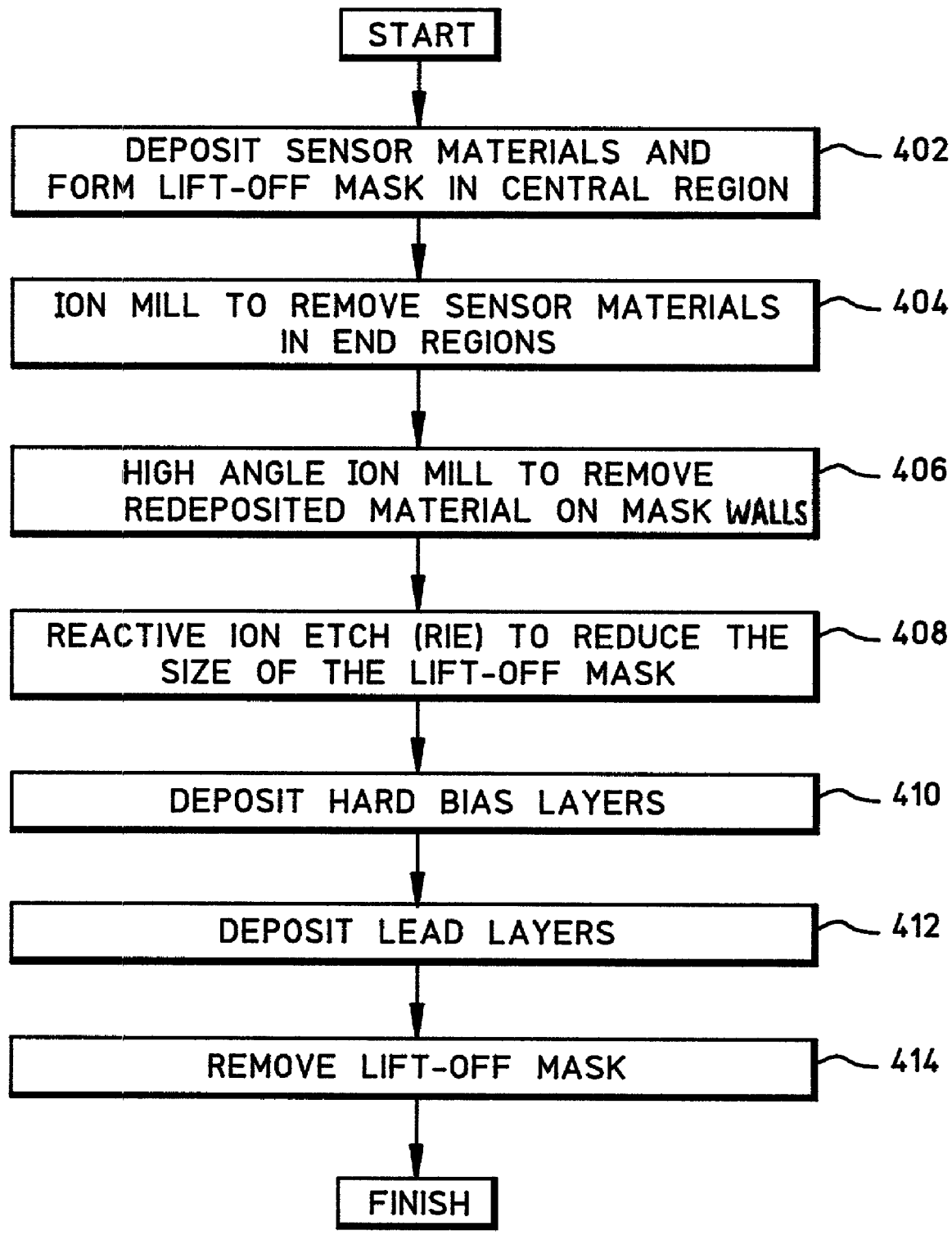
FIG. 4 is a flowchart which describes a method of making a magnetic head with improved contiguous junctions.
Figure 5:
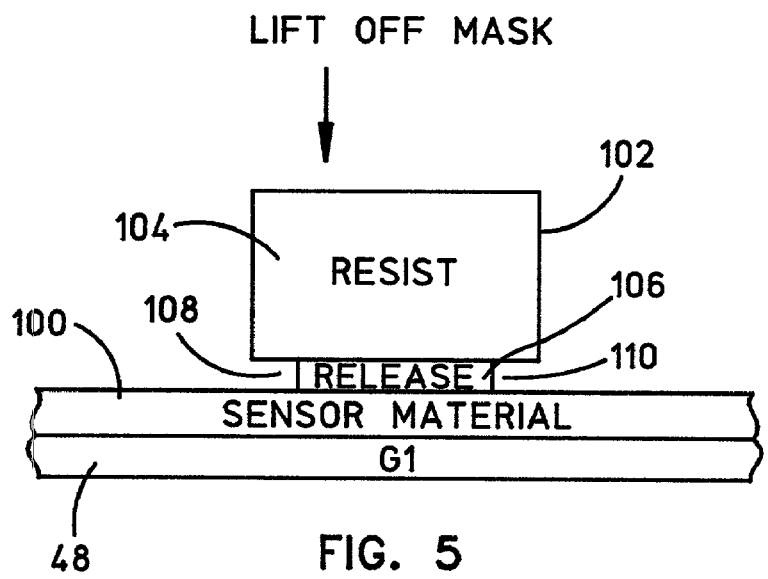
FIG. 5 is an ABS illustration of the first step in forming a lift-off mask on top of multiple sputtered thin films of sensor material.

Referring first to FIG. 5, the initial steps of forming a contiguous junction between the read sensor and first and second hard bias and lead layers are illustrated. After sputter depositing multilayers of sensor material 100 on first gap layer 48, a bi-layer lift-off mask 102 is formed on top of sensor material layer 100 in a central region where the read sensor is to be formed (step 402 of FIG. 4). Release layer 106 has first and second side edges which are recessed below photoresist layer 104 to provide first and second undercuts 108 and 110 below photoresist layer 104. Lift-off mask 102 includes a top photoresist layer 104 and a bottom release layer 106. Lift-off mask 102 may be formed using conventional methods, such as that described in U.S. Pat. No. 5,018,037.

Photoresist layer 104, which may be a polyphenolic polymer or polyvinylphenol, may be spun on top of release layer 106. A polyphenolic polymer is a copolymer of phenol and formaldehyde. Polyphenolic polymer is also known commercially as Novolak, which can be purchased from Hoechst Celanese, Sumitomo, or Shipley. This photoresist layer 1041 may be formed to a thickness within the range of about 2000–5000 Angstroms, or preferably to a specific thickness of about 3500 Angstroms. Release layer 106 may also be referred to as a lift-off layer. Release layer 106 may be or include a material such as, but not limited to, polydimetyhlglutarimide (PMGI), a metal such as aluminum-copper (AlCu), or materials high in tungsten (W). Release layer 106 may be coated to a specified thickness within the range of about 200–1200 Angstroms, or preferably to a specific thickness of about 600 Angstroms. If using materials high in tungsten, this material is made such that it does not intermix with resists such as polyimide, polyarylethers, or lightly cross-linked Novolak.

Figure 6:
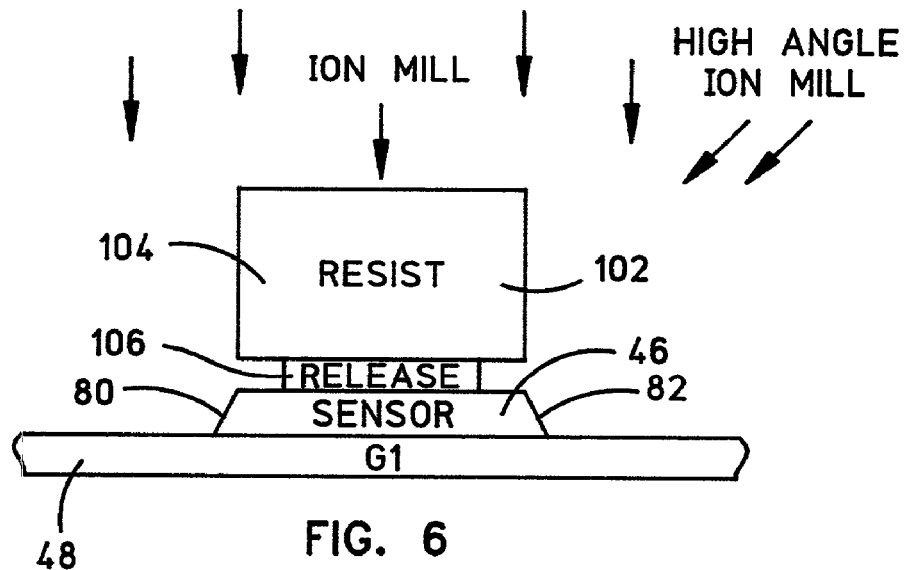
FIG. 6 is the same as FIG. 5 except ion milling has been employed to remove exposed portions of sensor material about the mask.

As shown in FIG. 6, conventional ion milling is then employed to remove all of the sensor material except for that portion below lift-off mask 102, so as to form read sensor 46 in the central region having first and second side edges 80 and 82 (step 404 of FIG. 4). The angle at which the ion milling is performed here is relatively low, between about 5 and 30 degrees. First and second side edges 80 and 82 slope slightly outwardly because of the milling angle and a shadowing effect from lift-off mask 102. The photoresist mask is then subjected to a high-angle ion mill (step 406 of FIG. 4). "High-angle" ion milling is defined herein to be ion milling performed at an angle of between 45 and 80 degrees relative to a normal to the layers. This high-angle ion milling is performed until redeposited material that has built up on the photoresist side walls from the ion mill is removed.

Figure 7:
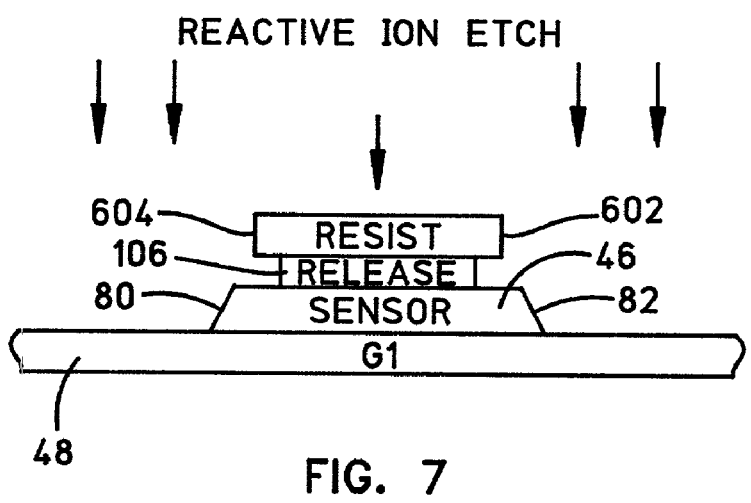
FIG. 7 is the same as FIG. 6 except that reactive ion etching (RIE) has been employed to reduce the thickness and the width of the lift-off mask.

In FIG. 7, a reactive ion etching (RIE) process is then used to reduce the size of the lift-off mask to form a reduced-size lift-off mask 602 (step 408 of FIG. 4). More particularly, the thickness or both the thickness and the width of photoresist layer 104 (FIG. 6) are reduced to form a reduced-size photoresist layer 604 (FIG. 7). Note that the reduced sizes of lift mask 602 and photoresist layer 604 in FIG. 7 are exaggerated only for purposes of illustration and clarity. Importantly, the RIE also removes top capping layer materials (tantalum or oxidized tantalum) from the exposed top edges of read sensor 46 to expose top conductive layer materials of read sensor 46 on these top edges.

The RIE process may utilize any suitable etch gas, such as one containing fluorine (e.g., $CHF_3$, $C_3F_8$, or $CF_4$). Preferably, the thickness of photoresist layer 104 (FIG. 6) is reduced by between 25–75% (e.g. 50%) and the width may be reduced by between 10–30% (e.g 10%) by exposure to the RIE. For example, if photoresist layer 104 (FIG. 6) has an initial thickness of 3500 Angstroms and an initial width of 2000 Angstroms, reduced-size photoresist layer 602 (FIG. 7) has a thickness of 1500 Angstroms and a width of 1600 Angstroms after the RIE.

Figure 8:
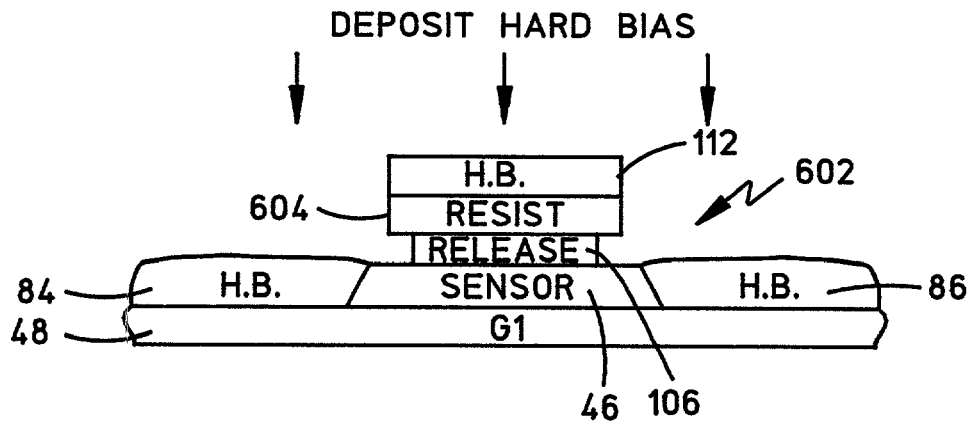
FIG. 8 is the same as FIG. 7 except first and second hard bias layers have been sputter deposited over the entire wafer as well as on top of the mask.

Next in FIG. 8, a fill film of hard bias material 84 and 86 is sputter deposited over the structure (step 410 of FIG. 4). Hard bias layers 84 and 86 are layers of suitable hard magnetic material, such as cobalt-platinum-chromium or other suitable cobalt-based alloy, which are deposited to a thickness of between about 50 and 500 Angstroms. Since lift-off mask 602 has a reduced size, the amount of hard bias formed in the contiguous junction region is increased as compared with the use of conventional methods. Advantageously, the increased thickness of the hard bias in the junction region enhances the stability of read sensor 46.

Figure 9:
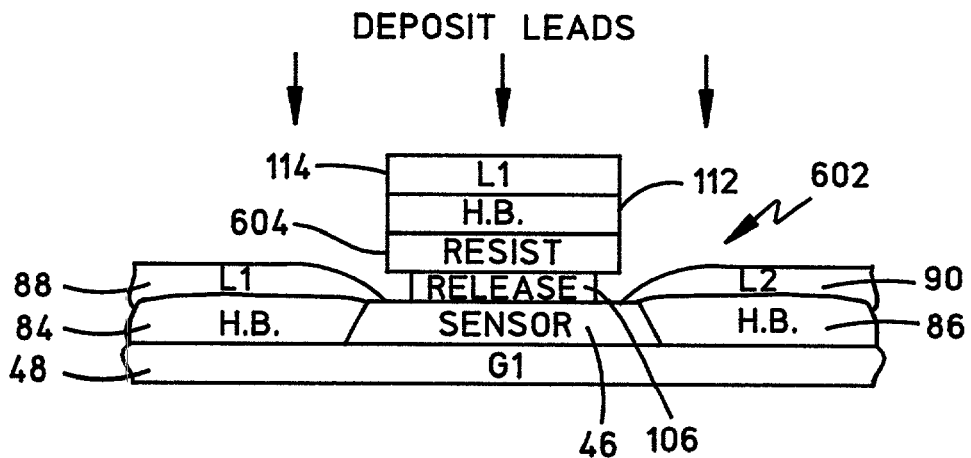
FIG. 9 is the same as FIG. 8 except first and second lead layers have been sputter deposited over the entire wafer as well as on top of the mask.

The deposition of hard bias layers 84 and 86 is followed by the sputter deposition of a full film of lead material 88 and 90 as shown in FIG. 9 (step 412 of FIG. 4). Note that a portion of hard bias material layer 112 and a portion of lead material layer 114 are also formed on top of reduced-size lift-off mask 602. Lead layers 88 and 90 may be made of any suitable conductive material, such as gold, tungsten, rhodium, or tantalum, and may be deposited to a thickness of between 100 and 1000 Angstroms.

Since lift-off mask 602 has a reduced size, the edges of the leads are formed more closely over the top edges of read sensor 46 as compared with the use of conventional methods (see the top edges of read sensor 46 in FIG. 9). Recall that the RIE from step 406 of FIG. 4 also removed capping layer materials (tantalum and oxidized tantalum) from the top edges of read sensor 46 to expose conductive materials of read sensor 46 on the top edges. Therefore, the extended leads over read sensor 46 shunt current from the edges of the read sensor to improve the transfer curve.

Figure 10:
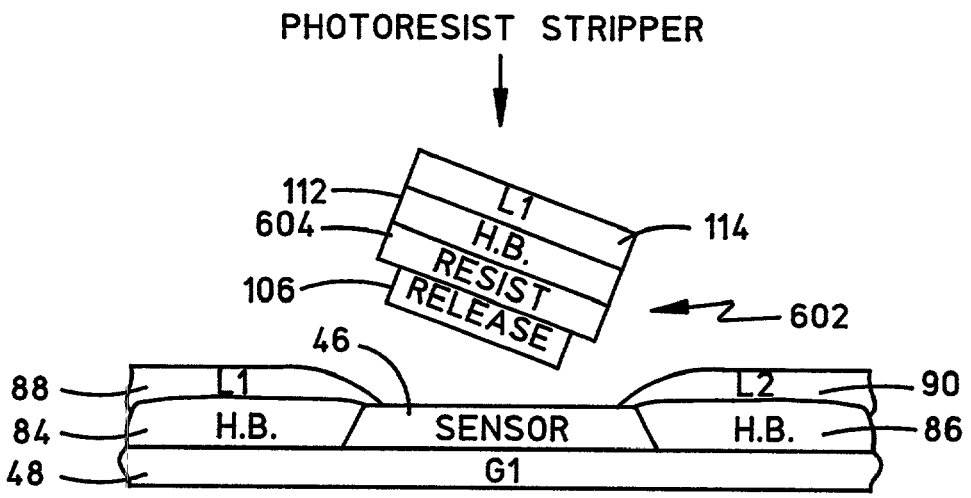
FIG. 10 is the same as FIG. 9 except the mask has been removed with a stripper solution.

In FIG. 10, the wafer is then subjected to a photoresist stripper which dissolves release layer 106 and releases reduced-size lift-off mask 602 (step 414 of FIG. 4) from read sensor 80. An exemplary photoresist stripper for release layer 106 which may be used is N-methyl pyrrolidone (NMP). Although removal of lift-off mask 602 may be a conventional step, any method to remove lift-off mask 602 may be utilized. Improved contiguous junctions between first and second side edges 80 and 82 of the read sensor and hard bias layers 84 and 86 and first and second lead layers 88 and 90 are thereby formed. Other processes, conventional or otherwise, may be used to complete the making of the read head.

In one variation of the method previously described, only ion milling steps are utilized to obtain the desired photoresist size. In this variation, a high-angle ion mill is performed to obtain a suitable target track width (TW) and a low-angle ion mill is subsequently performed to obtain a suitable photoresist thickness. As stated previously, the angle of the high-angle ion mill may be between 45 and 80 degrees, whereas the angle of the low-angle ion mill may be between about 5 and 30 degrees.

As described earlier, lift-off masks formed using commercially available photoresists are relatively thick (e.g. thicker than 3000 Angstroms). Without using special processes, thick photoresist layers cause shadowing where the thickness of the hard bias layers in the contiguous junction region is less than optimal. Also, the relatively large width of the photoresist causes the sensor coverage by the hard bias and lead layers to be less than ideal. By reducing the size of the lift-off mask in a controlled fashion (e.g., by RIE or ion mill) prior to depositing the hard bias and lead layers, the hard bias thickness may be increased in the junction region and the conductive leads may be deposited more closely over the sensor edges. Advantageously, the stability of the sensor is enhanced and the transfer curve is improved using a method which can be controlled independently from the initial mask structure and ion milling process. No critical alignments or multiple photoresist processes are necessary.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of making a magnetic head, comprising:
    forming sensor layer materials over a substrate;
    forming a lift-off mask over the sensor layer materials in a central region which is surrounded by end regions;
    milling, with use of the lift-off mask, such that the sensor layer materials in the end regions are removed and the sensor layer materials in the central region remain to thereby form a read sensor;
    after the act of milling, etching the lift-off mask to reduce a size of the lift-off mask; and
    with the reduced-sized lift-off mask in place, depositing hard bias and lead layers in the end regions adjacent the read sensor.

2. The method of claim 1, wherein the act of etching the lift-off mask comprises reactive ion etching (RIE).

3. The method of claim 1, further comprising:
    wherein the act of milling comprises a low-angle ion milling; and
    after the milling and prior to the etching, exposing the lift-off mask to a high-angle ion mill to remove redeposited material on side walls of the lift-off mask.

4. The method of claim 1, further comprising:
    wherein the act of milling comprises a low-angle ion milling;
    after the milling and prior to the etching, exposing the lift-off mask to a high-angle ion mill to remove redeposited material on side walls of the lift-off mask; and
    wherein the act of etching comprises reactive ion etching (RIE).

5. The method of claim 1, further comprising:
    wherein the act of milling comprises a low-angle ion milling;
    after the milling and prior to the etching, exposing the lift-off mask to a high-angle ion mill to remove redeposited material on side walls of the lift-off mask and to define a target track width (TW) of the magnetic head; and wherein the act of etching comprises a low-angle ion milling to reduce a thickness of the lift-off mask.

6. The method of claim 1, wherein the act of etching comprises etching to reduce the thickness and the width of a top photoresist layer of the lift-off mask.

7. The method of claim 1, wherein the act of etching comprises removing capping layer materials from top edges of the read sensor and the act of depositing lead layers comprises depositing lead layers over the top edges of the read sensor.

8. The method of claim 1, wherein the lift-off mask includes a release layer and the method further comprises the act of:

dissolving the release layer to remove the reduced size lift-off mask from the read sensor.

9. A method of making a magnetic head, comprising:

forming sensor layer materials over a substrate;

forming a liftoff mask over the sensor layer materials in a central region which is surrounded by end regions;

ion milling, with use of the lift-off mask, such that the sensor layer materials in the end regions are removed and the sensor layer materials in the central region remain to thereby form a read sensor;

after the act of milling, reactive ion etching (RIE) the lift-off mask to reduce a size of the lift-off mask;

depositing hard bias and lead layers adjacent the read sensor with the use of the reduced-sized lift-off mask; and removing the reduced-sized lift-off mask from the read sensor.

10. The method of claim 9, further comprising the act of:

after the ion milling and prior to the RIE, exposing the lift-off mask to a high-angle ion mill to remove redeposited material on side walls of the lift-off mask.

11. The method of claim 9, wherein the act of RIE comprises reducing the thickness and the width of the lift-off mask.

12. The method of claim 9, further comprising:

wherein the act of ion milling comprises low-angle ion milling; and after the ion milling and prior to the RIE, exposing the lift-off mask to a high-angle ion mill to remove redeposited material on side walls of the lift-off mask.

13. The method of claim 9, wherein the act of RIE comprises removing capping layer materials from top edges of the read sensor and the act of depositing lead layers comprises depositing lead layers over the top edges of the read sensor.

14. The method of claim 9, wherein the act of removing the reduced-sized lift-off mask comprises dissolving a release layer of the lift-off mask to remove the reduced size lift-off mask from the read sensor.

15. A method of making a read head so that the read head has improved contiguous junctions, the method comprising:

forming sensor layer materials over a gap layer;

forming a lift-off mask over the sensor layer materials in a central region which is surrounded by end regions;

ion milling, with use of the lift-off mask, such that the sensor layer materials in the end regions are removed and the sensor layer materials in the central region remain to thereby form a read sensor;

after the act of milling, etching the lift-off mask to reduce the size thereof and to remove capping layer materials from top edges of the read sensor;

with the reduced-sized lift-off mask in place, depositing hard bias and lead layers in the end regions adjacent the read sensor such that edges of the lead layers are formed over the top edges of the read sensor; and removing the reduced-sized lift-off mask from the read sensor.

16. The method of claim 15, wherein the act of etching comprises reactive ion etching (RIE).

17. The method of claim 15, further comprising:

wherein the act of ion milling comprises a low-angle ion milling; and after the ion milling and prior to the etching, exposing the lift-off mask to a high-angle ion mill to remove redeposited material on side walls of the lift-off mask.

18. The method of claim 15, further comprising:

wherein the act of ion milling comprises a low-angle ion milling;

after the ion milling and prior to the etching, exposing the lift-off mask to a high-angle ion mill to remove redeposited material on side walls of the lift-off mask; and wherein the act of etching comprises reactive ion etching (RIE).

19. The method of claim 15, further comprising:

wherein the act of ion milling comprises a low-angle ion milling;

after the ion milling and prior to the etching, exposing the lift-off mask to a high-angle ion mill to remove redeposited material on side walls of the lift-off mask and to define a target track width (TW) of the magnetic head; and wherein the act of etching comprises a low-angle ion milling to reduce a thickness of the lift-off mask.

20. The method of claim 15, wherein the act of reducing the thickness and the width of the lift-off mask comprises reducing them by at least 10 percent.

* * * * *